United States Patent [19]

Yaginuma et al.

[11] Patent Number: 5,744,508
[45] Date of Patent: Apr. 28, 1998

[54] FOAMABLE SILICONE RUBBER COMPOSITION

[75] Inventors: Atsushi Yaginuma, Gunma-machi; Yoshifumi Harada, Haruna-machi, both of Japan

[73] Assignee: Shin-Etsu Chemical Co., Ltd., Tokyo, Japan

[21] Appl. No.: 858,692

[22] Filed: May 19, 1997

[30] Foreign Application Priority Data

May 20, 1996 [JP] Japan ................... 8-148568

[51] Int. Cl.⁶ ................................. C08G 9/02
[52] U.S. Cl. ................ 521/99; 521/110; 521/117; 521/154; 528/15
[58] Field of Search ................ 521/99, 117, 110, 521/154; 528/15

[56] References Cited

U.S. PATENT DOCUMENTS

| | | | |
|---|---|---|---|
| 3,923,705 | 12/1975 | Smith | 521/154 |
| 4,026,842 | 5/1977 | Lee et al. | 521/154 |
| 4,026,845 | 5/1977 | Kim et al. | 521/154 |
| 4,418,157 | 11/1983 | Modic | 521/82 |
| 4,808,634 | 2/1989 | Uriarte et al. | 521/154 |

*Primary Examiner*—Morton Foelak
*Attorney, Agent, or Firm*—Oblon, Spivak, McClelland, Maier & Neustadt, P.C.

[57] ABSTRACT

A foamable silicone rubber composition is provided that includes:

(A) a diorganopolysiloxane;

(B-1) an organohydrogenpolysiloxane represented by the general formula (2):

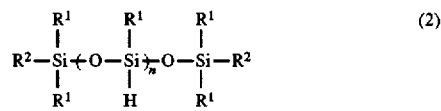

(B-2) an organohydogenpolysiloxane represented by the general formula (3):

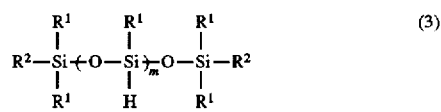

(C) a hydroxyl-group source; and (D) a platinum group metal compounds;

the component (B-1) and the component (B-2) being in a weight ratio of from 20/80 to 90/10.

11 Claims, No Drawings

FOAMABLE SILICONE RUBBER COMPOSITION

BACKGROUND OF THE INVENTION

1. Field of the Invention

This invention relates to a novel foamable silicone rubber composition, and more particularly to a foamable silicone rubber composition that can obtain a low-density silicone rubber sponge by curing.

2. Description of the Prior Art

Silicone rubber sponges having both the heat resistance, freeze resistance, electrical insulation properties and flame retardance inherent in silicone rubbers and the resilience inherent in sponges are known in the art as disclosed, e.g., in U.S. Pat. Nos. 3,923,705, 4,026,842 and 4,418,157 corresponding to Japanese Patent Publication (kokoku) Nos. 52-42826, No. 53-48225 and No. 5-53823, respectively. These silicone rubber sponges, however, require a higher production cost than organic resin type sponges, and hence their uses are limited.

Accordingly, as silicone rubber sponges that can be produced at a low cost, studies are made on low-density silicone rubber sponges. For example, they are silicone rubber sponges obtained by curing foamable silicone rubber compositions containing a fluorinated surface active agent (U.S. Pat. No. 4,026,845 corresponding to Japanese Patent Publication (kokoku) No. 53-30738) or a ketoxime compound (U.S. Pat. No. 4,808,634 corresponding to Japanese Pre-examination Patent Publication (kokai) No. 1-315435).

The fluorinated surface active agent, however, must be used in a high content before low-density sponges can be obtained, and also it is so expensive that it can not contribute to the lowering of production cost. In order to accomplish low-density sponges by the use of the ketoxime compound, it must be added in a reasonable amount and also a platinum group catalyst may be poisoned, bringing about the problems of an unstable curability of foamable silicone rubber compositions and a difficulty in their handling.

SUMMARY OF THE INVENTION

Accordingly, an object of the present invention is to provide a novel foamable silicone rubber composition that can be free from such problems and can obtain a low-density silicone rubber sponge.

As a result of extensive studies, the present inventors have discovered that a specific silicone rubber composition can solve the above problems.

That is, the present invention provides a foamable silicone rubber composition comprising:

(A) a diorganopolysiloxane blocked with vinyl groups at the both terminals of its molecular chain and having a viscosity of from 25 cSt to 1,000,000 cSt at 25° C.;

(B-1) an organohydrogenpolysiloxane represented by the general formula (2):

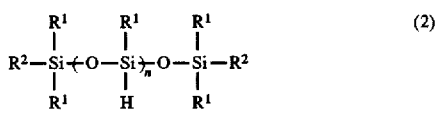

wherein $R^1$'s each represent a substituted or unsubstituted monovalent hydrocarbon group containing no aliphatic unsaturated bond; $R^2$'s each independently represent a monovalent group or atom selected from the group consisting of a substituted or unsubstituted monovalent hydrocarbon group, a hydrogen atom and a hydroxyl group; and n is an integer greater than 10;

(B-2) an organohydrogenpolysiloxane represented by the general formula (3):

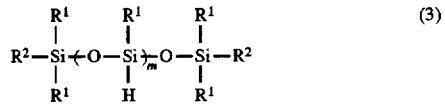

wherein $R^1$'s and $R^2$'s are as defined above, and m is an integer that satisfies $3 \leq m \leq 10$;

(C) at least one hydroxyl-group source selected from the group consisting of water, an alcohol, a silanol group-containing organosilane and a silanol group-containing organosiloxane; and (D) a platinum group metal compound;

the component (B-1) and the component (B-2) being in a weight ratio of from 20/80 to 90/10.

The present invention also provides a silicone rubber sponge obtained by curing the above foamable silicone rubber composition.

The silicone rubber sponge obtained by curing the foamable silicone rubber composition of the present invention has a low density and a uniformity in cell shapes.

DESCRIPTION OF THE PREFERRED EMBODIMENTS

The present invention will be described below in detail.

The foamable silicone rubber composition of the present invention basically contains a component-(A) specific diorganopolysiloxane, a component-(B) specific organohydrogenpolysiloxane, a component-(C) hydroxyl-group source and a component-(D) platinum group metal compound.

Component (A)

The component (A) is a straight-chain diorganopolysiloxane blocked with vinyl groups at the both terminals of its molecular chain. This diorganopolysiloxane has a viscosity of from 25 to 1,000,000 cSt, preferably from 50 to 500,000 cSt, more preferably from 100 to 200,000 cSt at 25° C.

The diorganopolysiloxane may include, e.g., a compound represented by the general formula (1):

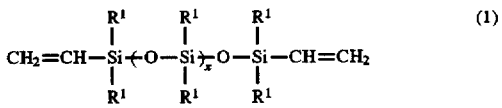

wherein $R^1$'s each represent a substituted or unsubstituted monovalent hydrocarbon group containing no aliphatic unsaturated bond, and x is a value that satisfies the above range of the viscosity at 25° C.

In the general formula (1), the substituted or unsubstituted monovalent hydrocarbon groups containing no aliphatic unsaturated bond, represented by $R^1$'s, may include alkyl groups having 1 to 6 carbon atoms such as a methyl group, an ethyl group and a propyl group; cycloalkyl groups having 6 to 10 carbon atoms such as a cyclohexyl group; aryl groups having 6 to 10 carbon atoms such as a phenyl group and a tolyl group; aralkyl groups having 7 to 12 carbon atoms such as a benzyl group, a 2-phenylethyl group and a 2-phenylpropyl group; and any of these groups at least one hydrogen atom of which has been substituted with a halogen atom (e.g., a 3,3,3-trifluoropropyl group). Methyl groups are preferred. The groups represented by $R^1$'s may be all the same or may be different from one another.

Letter symbol x represents a value that satisfies the above viscosity range, and may usually be a number of 10 or more. The component (A) may be a mixture of two or more diorganosiloxanes with different degree of polymerization (x).

Component (B)

The component (B) is an organohydrogenpolysiloxane comprised of a component (B-1) represented by the general formula (2):

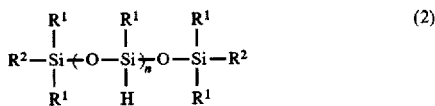 (2)

wherein $R^1$'s are as defined above; $R^2$'s each independently represent a monovalent group or atom selected from the group consisting of a substituted or unsubstituted monovalent hydrocarbon group (preferably a monovalent hydrocarbon group containing no aliphatic unsaturated bond), a hydrogen atom and a hydroxyl group; and n is an integer greater than 10, and is usually an integer of from 11 to 200, preferably from 15 to 100, and particularly from 20 to 50, in approximation; and a component (B-2) represented by the general formula (3):

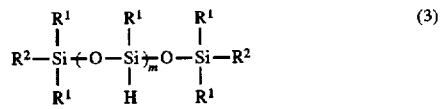 (3)

wherein $R^1$'s and $R^2$'s are as defined above, and m is an integer that satisfies $3 \leq m \leq 10$, and preferably $4 \leq m \leq 8$. The use of the components (B-1) and (B-2) in combination as the component (B) makes it possible to obtain a silicone rubber sponge appropriately expanded when the composition of the present invention is cured and foamed.

If m is smaller than 3 in the compound of the general formula (3), the resulting composition may be insufficiently cured and foamed to make it impossible to obtain the intended low-density silicone rubber sponge. On the other hand, if it is greater than 10, the use of the components (B-1) and (B-2) in combination can not be effective.

Of the groups represented by $R^2$'s in the general formulas (2) and (3), the substituted or unsubstituted monovalent hydrocarbon groups containing no aliphatic unsaturated bond may include the same ones as exemplified for $R^1$'s, and methyl groups are preferred.

As specific examples of the component (B-1), it may include the following.

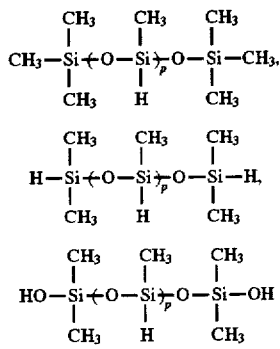

(In the foregoing, p's each represent an integer of from 15 to 100, and preferably from 20 to 50, in approximation.)

As specific examples of the component (B-2), it may include the following.

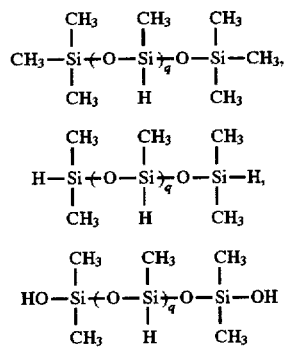

(In the foregoing, q's each represent an integer of from 3 to 10, and preferably from 4 to 8.)

The components (B-1) and (B-2) are used in a weight ratio [(B-1)/(B-2)] ranging from 20/80 to 90/10, and preferably from 30/70 to 70/30. If the component (B-1) is used in a proportion lower than the above range, the resulting silicone rubber sponge may have cells which are too large and also non-uniform. On the other hand, if the component (B-1) is used in a proportion higher than the above range, the intended low-density silicone rubber sponge can not be obtained.

The component (B) may usually be mixed in such an amount that the hydrogen atoms bonded to silicon atoms (i.e., SiH groups) contained in the component-(B) is present in an amount of 1 to 10 moles per mole of the total of the vinyl groups of the component (A) and the hydroxyl groups of the component (C) [or the component (B) and the component (C) in the case where the component (B) has hydroxyl groups in its molecule]. If the SiH groups in the component (B) are in a too small amount, the composition of the present invention can not be well foamed. If on the other hand they are in a too large amount, the hydrogen atoms bonded to silicon atoms may remain in the resulting silicone rubber sponge to cause a lowering of physical properties as a result of thermal deterioration.

Component (C)

The component (C) is at least one hydroxyl-group source selected from the group consisting of water, an alcohol, a silanol group-containing organosilane and a silanol group-containing organosiloxane. The component (C) has the function to react with the component (B) to cause it expand and foam, when the composition of the present invention is cured.

The alcohol may include, e.g., monohydric or polyhydric alcohols having 1 to 12 carbon atoms, preferably including monohydric alkyl alcohols such as methanol, ethanol, propanol, isopropyl alcohol, butanol, lauryl alcohol and octyl alcohol.

The silanol group-containing organosilane may include, e.g., compounds represented by the general formulas (4)' and (4)".

 (4)'

-continued

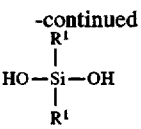
(4)"

(In the formulas, R$^1$'s are as defined previously.) Stated specifically, they are exemplified by the following compounds.

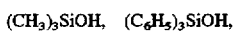

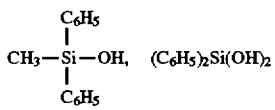

The silanol group-containing organosiloxane may include, e.g., a compound represented by the general formula (5).

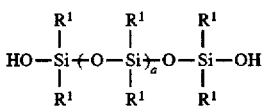
(5)

(In the formulas, R$^1$'s are as defined previously, and a is an integer that satisfies a≧0, generally 0≦a≦50, and preferably 1≦a≦50, more preferably 3≦a ≦20.)
Stated specifically, it is exemplified by the following compound.

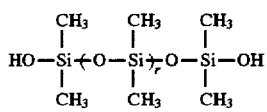

(wherein r represents an integer of from 0 to 50, and preferably from 1 to 15.)

The component (C) may usually be mixed in an amount of from 0.1 to 20 parts by weight, and preferably from 0.2 to 10 parts by weight, based on 100 parts by weight of the component (A). If the component (C) is in a too small amount, no sufficient foamability can be obtained. If on the other hand it is in a too large amount, the resulting silicone rubber sponge may have low physical properties.

Component (D)

The component (D) is a platinum group metal compound, which is a catalyst that accelerates the addition reaction of the vinyl groups in the component (A) with the SiH groups in the component (B) and also a catalyst that accelerates the condensation reaction of the hydroxyl groups in the component (C) or the components (B) and (C) in the case the component (B) has hydroxyl groups in its molecule with the SiH groups in the component (B).

As the platinum group metal compound, known platinum group metals themselves and compounds thereof may be used which are conventionally used in the above addition reaction and condensation reaction. For example, it may include fine-particle platinum supported by silica, alumina, silica gel or the like; a complex of platinic chloride, chloroplatinic acid or chloroplatinate hexahydrate with an olefin or divinyldimethylpolysiloxane, or an alcohol solution of chloroplatinate hexahydrate; palladium catalysts; and rhodium catalysts.

Platinum compounds are preferred.

The component (D) may be mixed in what is called a catalytic quantity, and may usually be in an amount from 1 to 500 ppm (in terms of platinum group metal), and preferably from 10 to 100 ppm, based on the total weight of the organopolysiloxane components comprised of or the components (A), (B) and (C). If the component (D) is used in a too small amount, the condensation reaction can not be well accelerated, resulting in insufficient curing and foaming. On the other hand, even if used in a too large amount, its use can not be more effective, resulting in an economical disadvantage.

Other Additives

In the foamable silicone rubber composition of the present invention, in addition to the components (A) to (D), other additives may be optionally used. For example, such additives may include resin copolymers having a three-dimensional network structure comprised of an (R')$_3$SiO$_{1/2}$ (wherein R' is selected from the group consisting of an alkyl group, an aryl group, a cycloalkyl group, a vinyl group, an allyl group and a fluoroalkyl group) unit and an SiO$_2$ unit in a molar ratio ranging from 0.25/1 to 0.8/1, which are used to enhance the strength of the silicone rubber sponge to be obtained; inorganic fillers such as fumed silica, precipitated silica, diatomaceous earth, fine quartz powder, iron oxide, titanium oxide, aluminum oxide, aluminum silicate, zinc white and carbon black, or any of these surface-treated with organochlorosilane, organopolysiloxane, hexaorganosilazane or the like; antistatic agents; heat-resisting agents; flame-retardants; pigments; glass fibers; and carbon fibers.

Any of these additives may be used alone, or in combination of two or more.

These additives may be mixed in any desired amount appropriately determined within the range that does not damage the object of the present invention.

It is also desirable to add a platinum catalyst inhibitor such as a polymethylvinylsiloxane cyclic compound, an acetylene type alcohol or a peroxide.

EXAMPLES

The present invention will be described below in greater detail by giving Examples. In the following Examples and Comparative Examples, "part(s)" refers to "part(s) by weight", and viscosity is indicated as a value at 25° C.

Examples 1 to 3, Comparative Examples 1 & 2

In each Example and Comparative Example;

(A-1) a linear dimethylpolysiloxane blocked with vinyl groups at the both terminals of its molecular chain and having a viscosity of 100,000 cSt;

(A-2) a linear dimethylpolysiloxane blocked with vinyl groups at the both terminals of its molecular chain and having a viscosity of 5,000 cSt;

(B-1) a methylhydrogenpolysiloxane represented by the average formula:

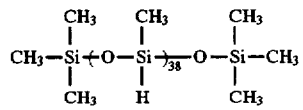

(B-2) a methylhydrogenpolysiloxane represented by the average formula:

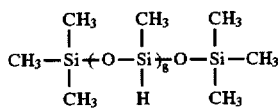

(C) water;
(D) a divinylmethylpolysiloxane complex of chloroplatinate hexahydrate (0.7% by weight in terms of platinum); and
(E) a resin copolymer comprised of a dimethylvinylsiloxane unit, a trimethylsiloxane unit and an $SiO_2$ unit (ratio of the total of dimethylvinylsiloxane units and trimethylsiloxane units to $SiO_2$ units: 0.8); were mixed in each amount as shown in Table 1, thus foamable silicone rubber compositions were prepared. Mole ratios of the total of SiH groups in the components (B-1) and (B-2) to the total of vinyl groups (Vi) in the components (A-1) and (A-2) and hydroxyl groups (OH) in the component (C) are also shown in Table 1.

The above compositions were each foamed and cured at room temperature, i.e. at 25° C. to obtain silicone rubber sponges. Next, the densities of the silicone rubber sponges obtained were measured and also the shapes of cells of the silicone rubber sponges were also evaluated. Results obtained are shown together in Table 1.

monovalent group or atom selected from the group consisting of a substituted or unsubstituted monovalent hydrocarbon group, a hydrogen atom and a hydroxyl group; and n is an integer greater than 10;

(B-2) an organohydrogenpolysiloxane represented by the general formula (3):

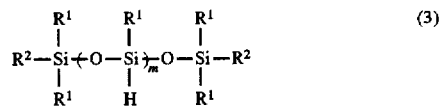

wherein $R^1$'s and $R^2$'s are as defined above, and m is an integer that satisfies $3 \leq m \leq 10$;

(C) at least one hydroxyl-group source selected from the group consisting of water, an alcohol, a silanol group-containing organosilane and a silanol group-containing organosiloxane; and (D) a platinum group metal compound;

the component (B-1) and the component (B-2) being present in a weight ratio (B-1)/(B-2) of from 20/80 to 90/10.

2. The composition of claim 1, wherein the organopolysiloxane of the component (A) has the general formula (1):

TABLE 1

|  |  | Example 1 | Example 2 | Example 3 | Comparative Example 1 | Comparative Example 2 |
|---|---|---|---|---|---|---|
| Components mixed (pbw) | (A-1) | 38 | 38 | 38 | 38 | 38 |
|  | (A-2) | 20 | 20 | 20 | 20 | 20 |
|  | (B-1) | 7 | 5 | 3 | 10 | — |
|  | (B-2) | 3 | 5 | 7 | — | 10 |
|  | (C) | 0.8 | 0.8 | 0.8 | 0.8 | 0.8 |
|  | (D) | 0.3 | 0.3 | 0.3 | 0.3 | 0.3 |
|  | (E) | 20 | 20 | 20 | 20 | 20 |
| Molar ratio of SiH/(Vi + OH) |  | 1.5/1 | 1.5/1 | 1.4/1 | 1.6/1 | 1.4/1 |
| Density (g/cm³) |  | 0.19 | 0.17 | 0.20 | 0.28 | 0.34 |
| Cell shape |  | Uniform, 1 mm or smaller in diameter | Uniform, 1 mm or smaller in diameter | Uniform, 1 mm or smaller in diameter | Uniform, 1 mm or smaller in diameter | Non-uniform, 1 mm or larger in diameter |

Example 4

The procedure of Example 1 was repeated except that 0.8 part of the water used therein was replaced with 0.6 part of water and 1.3 parts of isopropyl alcohol, to produce a foamable silicone rubber composition. This composition was foamed and cured at room temperature, i.e., 25° C. The resulting silicone rubber sponge had a density of 0.15 g/cm³.

What is claimed is:

1. A foamable silicone rubber composition comprising;
(A) a diorganopolysiloxane blocked with a vinyl group at the both terminals of its molecular chain and having a viscosity of from 25 cSt to 1,000,000 cSt at 25° C.;
(B-1) an organohydrogenpolysiloxane represented by the general formula (2):

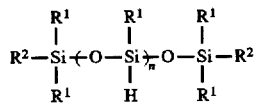

wherein $R^1$'s each represent a substituted or unsubstituted monovalent hydrocarbon group containing no aliphatic unsaturated bond; $R^2$'s each independently represent a

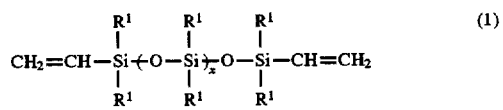

wherein $R^1$'s each represent a substituted or unsubstituted monovalent hydrocarbon group containing no aliphatic unsaturated bond, and x is a value such that the organopolysiloxane of the component (A) has a viscosity of from 25 cSt to 1,000,000 cSt at 25° C.

3. The composition of claim 2, wherein in the general formula (1) for the component (A) $R^1$ independently represents an alkyl group having 1 to 6 carbon atoms, a cycloalkyl group having 6 to 10 carbon atoms, an aryl group having 6 to 10 carbon atoms, an aralkyl group having 7 to 12 carbon atoms, or a corresponding substituted group in which at least one hydrogen atom of these hydrocarbon groups has been substituted with a halogen atom.

4. The composition of claim 1, wherein the component (B-1) includes at least one compound having any one of the formulas:

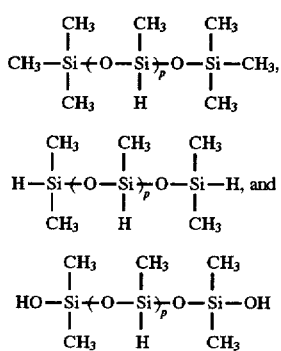

wherein in the formulas p's each represent an integer of from 15 to 100.

5. The composition of claim 1, wherein the component (B-2) includes at least one compound having any one of the formulas:

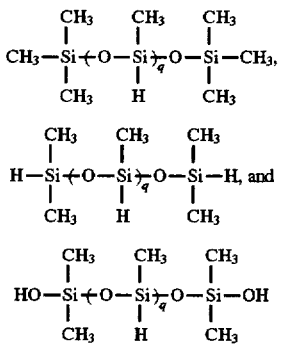

wherein in the formulas q's each represent an integer of from 3 to 10.

6. The composition of claim 1, wherein the components (B-1) and (B-2) are present in a weight ratio [(B-1)/(B-2)] ranging from 30/70 to 70/30.

7. The composition of claim 1, wherein the component (B) is present in such an amount that the hydrogen atoms bonded to silicon atoms contained in the component-(B) is present in an amount of 1 to 10 mole per mole of the total of the vinyl groups contained of the component (A) and the hydroxyl groups contained component (B) and component (C).

8. The composition of claim 1, wherein the component (C) is selected from the group consisting of monohydric alcohols having 1 to 12 carbon atoms, polyhydric alcohols having 1 to 12 carbon atoms, silanol group-containing organosilanes represented by the general formulas (4)':

wherein $R^1$'s are as defined in respect of the general formula (2) in claim 1, silanol group-containing organosilanes represented by the general formulas (4)":

wherein $R^1$'s are as defined in respect of the general formula (2) in claim 1, silanol group-containing organosiloxanes represented by the general formula (5).

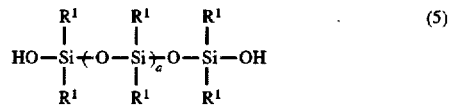

wherein $R^1$'s are as defined in respect of the general formula (2) in claim 1 and a is an integer of 0 or more.

9. The composition of claim 1, wherein the component (C) is present in an amount of from 0.1 to 20 parts by weight per 100 parts by weight of the component (A).

10. The composition of claim 1, wherein the component (D) is present in an amount of 1 to 500 ppm by weight in terms of the platinum group metal based on the total weight of the components (A), (B) and (C).

11. A silicone rubber sponge obtained by curing the foamable silicone rubber composition according to claim 1.

* * * * *